US012808383B2

(12) United States Patent
Jothiprasad et al.

(10) Patent No.: US 12,808,383 B2
(45) Date of Patent: Nov. 24, 2026

(54) DYNAMIC COMPRESSOR SYSTEM AND METHODS OF OPERATION

(71) Applicant: Aerospace Carbon Solutions LLC, Cincinnati, OH (US)

(72) Inventors: Giridhar Jothiprasad, Clifton Park, NY (US); Gregory Alexander Natsui, Albany, NY (US); Ya-tien Chiu, Niskayuna, NY (US); Ivan Malcevic, Niskayuna, NY (US)

(73) Assignee: Aerospace Carbon Solutions LLC, Evendale, OH (US)

( * ) Notice: Subject to any disclaimer, the term of this patent is extended or adjusted under 35 U.S.C. 154(b) by 13 days.

(21) Appl. No.: 18/829,818

(22) Filed: Sep. 10, 2024

(65) Prior Publication Data

US 2026/0071630 A1 Mar. 12, 2026

(51) Int. Cl.
*F04D 27/00* (2006.01)
*F04D 27/02* (2006.01)

(52) U.S. Cl.
CPC ......... *F04D 27/007* (2013.01); *F04D 27/009* (2013.01); *F04D 27/0215* (2013.01);
(Continued)

(58) Field of Classification Search
CPC .. F04D 27/007; F04D 27/009; F04D 27/0215; F04D 27/0223; F04D 27/0238;
(Continued)

(56) References Cited

U.S. PATENT DOCUMENTS 2,908,189 A 10/1959 Parker
3,861,822 A * 1/1975 Wanger ................ F04D 29/563 415/162

(Continued)

FOREIGN PATENT DOCUMENTS

EP 4707615 3/2026
FR 3127024 3/2023

(Continued)

OTHER PUBLICATIONS

Koflo Corporation, Static Mixers Brochure, 5 pp., publicly available as early as Jan. 15, 2026. https://www.koflo.com/static-mixers.html.

(Continued)

*Primary Examiner* — Phutthiwat Wongwian
*Assistant Examiner* — Rene D Ford
(74) *Attorney, Agent, or Firm* — Fitch, Even, Tabin & Flannery LLP

(57) ABSTRACT

Provided herein are dynamic compressor systems and methods of operation. A compressor system comprises a compressor and a variable flow extractor disposed downstream of the compressor to split a compressor outlet stream into a recirculation stream and a system outlet stream. A variable flow injector disposed upstream of the compressor that mixes the recirculation stream with a system feed stream to form a compressor inlet stream. A controller is configured to receive first data indicative of a pressure of the system outlet stream, second data indicative of a pressure of the system feed stream, and third data indicative of flow rates of at least two of the system feed stream, the system outlet stream, and the recirculation stream. The controller adjusts a flow rate of the recirculation stream via the variable flow extractor and the variable flow injector based on the first, second, and third data.

20 Claims, 6 Drawing Sheets

(52) U.S. Cl.
CPC ..... *F04D 27/0223* (2013.01); *F04D 27/0238* (2013.01); *F04D 27/0284* (2013.01); *F04D 27/0207* (2013.01); *F05D 2270/101* (2013.01)

(58) Field of Classification Search
CPC ............ F04D 27/0284; F04D 27/0207; F05D 2270/101
See application file for complete search history.

(56) References Cited

U.S. PATENT DOCUMENTS

| | | | | |
|---|---|---|---|---|
| 4,921,399 | A * | 5/1990 | Lew | F04D 27/0207 415/28 |
| 5,508,943 | A | 4/1996 | Batson | |
| 6,226,974 | B1 | 5/2001 | Andrew | |
| 6,629,428 | B1 | 10/2003 | Murry | |
| 7,673,459 | B2 | 3/2010 | Sheldon | |
| 7,926,256 | B2 | 4/2011 | Draper | |
| 8,192,171 | B2 | 6/2012 | Mehaffey | |
| 8,200,413 | B2 | 6/2012 | Brooks | |
| 8,210,793 | B2 | 7/2012 | Hale | |
| 8,272,222 | B2 | 9/2012 | Zhang | |
| 8,529,188 | B2 | 9/2013 | Winter | |
| 8,545,180 | B1 | 10/2013 | Liang | |
| 8,641,367 | B2 | 2/2014 | Norris | |
| 9,068,470 | B2 | 6/2015 | Mills | |
| 9,347,375 | B2 | 5/2016 | Hughes | |
| 9,581,095 | B2 | 2/2017 | Pursifull | |
| 9,650,956 | B2 | 5/2017 | Benz | |
| 9,657,660 | B2 | 5/2017 | Hellstrom | |
| 9,863,316 | B2 | 1/2018 | Payne | |
| 9,869,246 | B2 | 1/2018 | Benz | |
| 9,890,714 | B2 | 2/2018 | Soni | |
| 9,964,308 | B2 | 5/2018 | Antoniono | |
| 9,985,557 | B2 | 5/2018 | Kuczynski | |
| 10,801,399 | B2 | 10/2020 | Kotani | |
| 11,097,232 | B2 | 8/2021 | Glanville | |
| 11,274,880 | B2 | 3/2022 | Guy | |
| 11,473,442 | B1 | 10/2022 | Zorzi | |
| 11,486,316 | B2 | 11/2022 | Tang | |
| 11,629,647 | B2 | 4/2023 | Staubach | |
| 11,739,689 | B2 | 8/2023 | Sibbach | |
| 11,859,544 | B1 | 1/2024 | Lockyer | |
| 11,905,963 | B1 * | 2/2024 | Rashidi | F04D 27/002 |
| 12,000,344 | B2 | 6/2024 | Levisse | |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,378,933 | B2 | 8/2025 | Fefermann | |
| 2012/0121376 | A1 * | 5/2012 | Huis In Het Veld | F04D 27/0261 415/17 |
| 2015/0034771 | A1 | 2/2015 | Joubert | |
| 2016/0053766 | A1 * | 2/2016 | Lee | F04D 27/0284 415/17 |
| 2016/0102671 | A1 * | 4/2016 | Winkes | F04D 27/0215 415/118 |
| 2021/0164481 | A1 * | 6/2021 | Gassmann | F04D 27/001 |
| 2021/0190084 | A1 * | 6/2021 | Darry | F04D 27/0223 |
| 2024/0410319 | A1 | 12/2024 | Becoulet | |
| 2025/0018895 | A1 | 1/2025 | Howell | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |

FOREIGN PATENT DOCUMENTS

| | | |
|---|---|---|
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| JP | 2008106728 | 5/2008 |
| KR | 101204900 | 11/2012 |
| WO | 2009046292 | 4/2009 |

OTHER PUBLICATIONS

S. Abolfazl Moussavi Torshizi, "Improving the Performance of Centrifugal Compressors by Flow Recirculation", Journal of Applied Fluid Mechanics, vol. 12, No. 6, pp. 1791-1799, 2019, 10 pp.

U.S. Appl. No. 18/829,818, filed Sep. 10, 2024, "Dynamic Compressor System and Methods of Operation".

Westfall Manufacturing Company, Counter-Swirl Static Mixer Model 6000 Brochure, 3 pp., publicly available as early as Jan. 15, 2026. https://westfallstaticmixers.com/mixers/low-headloss-products/counter-swirl-static-mixer-model-6000/.

Westfall Manufacturing Company, Counter-Swirl Static Mixer Model 6000 video, publicly available as early as Jan. 15, 2026. https://youtu.be/Yk7W8BVquQQ.

Westfall Manufacturing Company, Variable Flow Static Mixer Model 2900 Brochure, 5 pp., publicly available as early as Jan. 15, 2026. https://westfallstaticmixers.com/mixers/high-shear-static-mixers/variable-flow-mixing-plate-model-2900/.

Zhao, Yiming, et al., "Study on the Performance of Collaborative Production Mode for Gas Wave Ejector", MDPI, Department of Chemical Machinery, Dalian University of Technology, Dalian 116012, China; Sustainability 2022, 14, 7261. https://doi.org/10.3390/su14127261; https://www.mdpi.com/journal/sustainability; 21 pgs.

* cited by examiner

DYNAMIC COMPRESSOR SYSTEM AND METHODS OF OPERATION

TECHNICAL FIELD

These teachings relate generally to compressors and more particularly to systems and methods for adapting to flow turndown in a compressor.

BACKGROUND

Compressors can experience a wide range of operating conditions, for example, wide ranges in incoming flow rates. In some scenarios, compressors may experience large flow turndowns, where the incoming flow rates drop below full load. Such large flow turndowns can affect the overall performance of a compressor and may make it more difficult to maintain stable compressor operation. Accordingly, it may be desirable to have compressor systems that are capable of accommodating flow turndown while maintaining an outlet pressure of the system in a target range.

BRIEF DESCRIPTION OF DRAWINGS

Various needs are at least partially met through provision of the dynamic compressor system and methods of operation described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
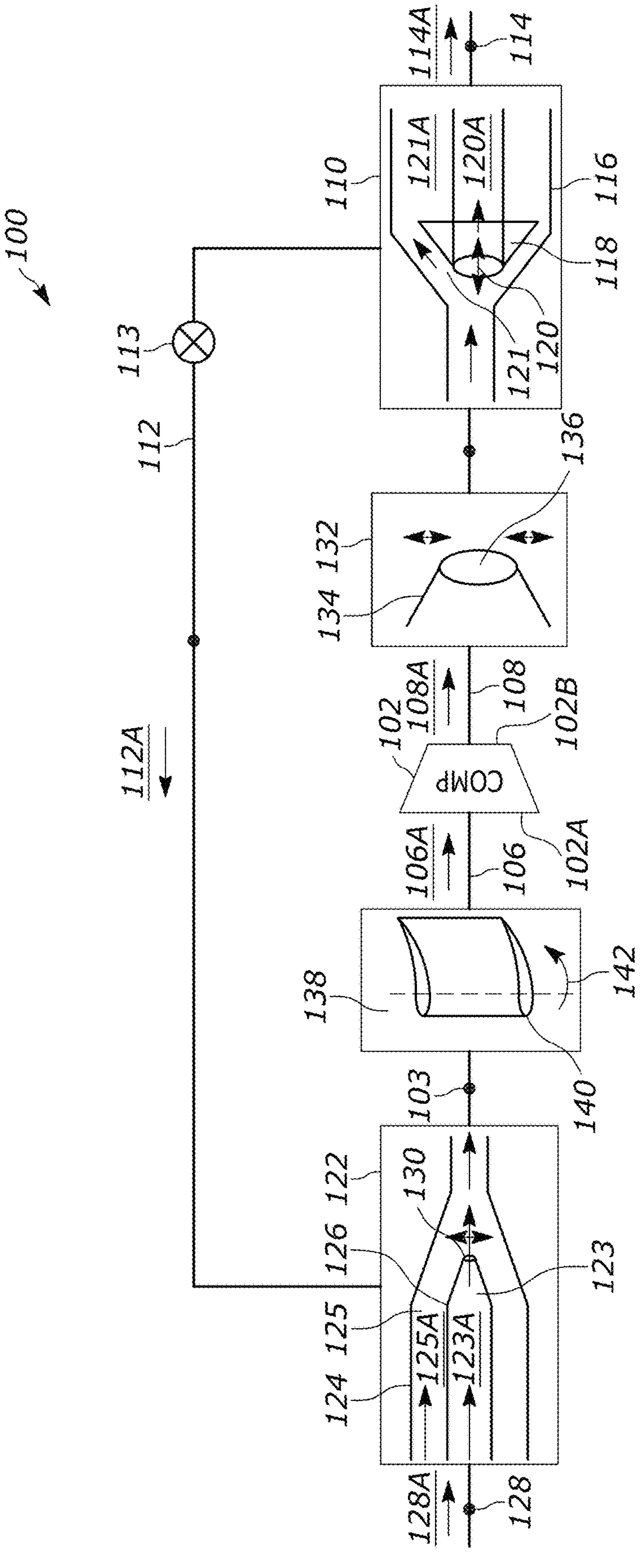
FIG. 1 is a schematic diagram of a compressor system, in accordance with various embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The dynamic compressor system and methods of operation described herein use a combination of variable features that are actuatable in real time to allow the compressor to respond to low inlet flow rates. The variable features of the dynamic compressor system include a variable flow extractor positioned downstream of the compressor to extract or split the flow from the compressor outlet into a recirculation stream and a system outlet stream. The recirculation stream recirculates a portion of the flow to maintain a flow through the compressor that is sufficient for stable operation regardless of flow turndown at the system inlet. The dynamic compressor system also includes a variable flow injector positioned upstream of the compressor to inject or mix the recirculation stream into the compressor inlet. In addition, in some aspects, the dynamic compressor system includes a variable area choke at the compressor outlet. Further, in some aspects, the dynamic compressor system also includes a variable inlet guide vane at the compressor inlet. The variable flow extractor, variable flow injector, variable area choke, and/or variable inlet guide vane can be actuated together to maintain the compressor system outlet pressures and/or flow rates in a target range when the compressor system experiences changes to inlet flow rates.

Traditional approaches for accommodating flow turndown involve either reducing compressor rotational speed or implementing a small amount of recirculation from compressor outlet to compressor inlet to heat up compressor inlet feed, allowing the compressor to operate reliably at lower flow rates. Using such traditional approaches to adapt to flow turndown causes the output pressure of the compressor to drop. Further, high levels of flow turndown occurring in a short period of time can cause the compressor to go into a stall.

Advantageously, the dynamic compressor system and methods of operation described herein can be used to adapt to flow turndown. That is, the dynamic compressor system can adjust operational parameters in response to changes in system input flow rates in order to maintain system outlet pressures within a target range, in particular, when there are high levels of flow turndown. Further, the dynamic compressor system can adjust operational parameters to maintain system outlet flow rates within a target range. Thus, the dynamic compressor systems and methods described herein can maintain compressor operation and prevent stalling or large drops in system outlet pressure, when a compressor experiences high levels of flow turndown.

It is contemplated that the compressor system and methods of operation described herein can be used in numerous applications. One exemplary application is in power-to-liquids (PTL) processes that produce chemicals that are in liquid form at ambient temperature and pressure from renewable energy sources. PTL processes often use electricity generation from renewable sources such as wind or solar power to generate hydrogen gas (H2) through water electrolysis. The hydrogen gas (H2) is then combined with carbon dioxide and used as a feed for the liquid synthesis reaction in the PTL process. Compressors may be used on the hydrogen gas (H2) feed stream to maintain the feed streams to the liquid synthesis reactor at target pressures. Recycle compressors may also be used to recycle back any unconverted feed gasses such as hydrogen gas (H2) and carbon dioxide back to the liquid synthesis reactor for improved process yields.

Renewable energy sources, however, may result in fluctuating power inputs for the PTL process, impacting the flow of hydrogen gas (H2) from electrolysis and resulting in intermittent, large flow turndowns of the hydrogen gas (H2) feed stream. Similarly, a recycle compressor may also experience intermittent, large flow turndowns of the recycle gas stream. Although batteries could be used to provide a constant power input to the PTL process and allow the compressor to operate at a single flowrate, the batteries may add significant cost. By operating the compressor(s) and the whole PTL process dynamically, the additional cost of storing the intermittent renewable electricity can be avoided.

There are many examples of PTL processes that may be used. For example, power-to-methanol (P2M) can convert H2 from water electrolysis combined with carbon dioxide to produce methanol in a methanol synthesis reactor. Some versions of methanol synthesis require the carbon dioxide to be converted to carbon monoxide, which can be combined with the H2 to form syngas and fed into the methanol synthesis reactor. For direct methanol synthesis, the hydrogen and carbon dioxide can be used directly.

In another example, the PTL process may include a Fischer-Tropsch process, where the feed carbon dioxide is converted to carbon monoxide through reverse water gas shift or electrochemical reduction, and then combined with hydrogen to form syngas. The syngas is fed to the Fischer-Tropsch synthesis reactor to form liquid hydrocarbons.

In another example, the PTL process may include a direct carbon dioxide to hydrocarbon process, where the feed carbon dioxide and hydrogen are converted to liquid hydrocarbons in a single synthesis step.

Turning now to the figures, FIG. 1 illustrates a compressor system 100. The compressor system 100 can be operated to maintain a system outlet pressure over a wide range of flow turndown.

The compressor system 100 includes a compressor 102, a variable flow extractor 110, and a variable flow injector 122 for splitting off and mixing a recirculation stream, respectively. In some embodiments, the compressor system 100 further includes a variable inlet guide vane 138 to ensure that fluid enters the compressor at a desired flow angle. In yet other embodiments, the compressor system 100 further includes a variable area choke 132 for adjusting flow through the compressor 102.

The compressor 102 may be any suitable compressor such as, but not limited to, reciprocating compressor, screw compressor, axial or centrifugal turbo compressors. The compressor 102 includes a compressor inlet 102A and a compressor outlet 102B. The compressor inlet 102A is a portion of the compressor 102 where a fluid to be compressed enters the compressor 102. The compressor inlet 102A is coupled to a compressor inlet path 106 and receives a compressor inlet stream 106A. The compressor inlet stream 106A comprises the fluid to be compressed. The compressor outlet 102B is a portion of the compressor 102 where compressed fluid exits the compressor 102. The compressor outlet 102B is coupled to a compressor outlet path 108. The compressor outlet 102B outputs a compressor outlet stream 108A through the compressor outlet path 108. The compressor outlet stream 108A comprises the compressed fluid. The compressor outlet 102B can deliver the compressed fluid at a target pressure. In some configurations, the compressor inlet 102A is upstream of impeller or rotor stages of the compressor 102 and the compressor outlet 102B is downstream of the impeller or rotor stages of the compressor 102.

The variable flow extractor 110 is disposed downstream of the compressor 102. The variable flow extractor 110 is in fluid communication with the compressor outlet 102B and receives at least a portion of the compressor outlet stream 108A. The variable flow extractor 110 is coupled to and in fluid communication with the recirculation path 112. The variable flow extractor 110 is also coupled to and in fluid communication with a system outlet path 114. The variable flow extractor 110 splits the compressor outlet stream 108A into the recirculation stream 112A that flows through the recirculation path 112 and a system outlet stream 114A that flows through the system outlet path 114. The variable flow extractor 110 is configured to split flow through the extractor into a first outlet stream 120A and a second outlet stream 121A radially outward of the first outlet stream 120A. In FIG. 1, the inner first outlet stream 120A is connected to the system outlet stream 114A and the outer second outlet stream 121A is connected to the recirculation stream 112A. In other embodiments, the outer second outlet stream 121A may instead be connected to the system outlet stream 114A and the inner first outlet stream 120A may be connected to the recirculation stream 112A. A split ratio of flow in the first outlet stream 120A to flow in the second outlet stream 121A is adjustable.

In some configurations, the variable flow extractor 110 comprises an outer extractor body 116 with an inner extractor body 118 disposed therein. The outer extractor body 116 is hollow and, in some examples, is generally conical. In some examples, the inner extractor body 118 is also generally conical. At least a portion of the inner extractor body 118 is hollow to define a first outlet flow path 120 that extends through the inner extractor body 118 from the compressor outlet path 108 to the system outlet path 114. The first outlet stream 120A flows through the first outlet flow path 120. A space between the inner extractor body 118 and the outer extractor body 116 defines a second outlet flow path 121 that is coupled to and in fluid communication with the recirculation path 112. The second outlet stream 121A flows through the second outlet flow path 121.

In some examples, the inner extractor body 118 is translatable upstream or downstream within the outer extractor body 116. Translating the inner extractor body 118 upstream or downstream within the outer extractor body 116 adjusts the split flow ratio of the first outlet stream 120A to the second outlet stream 121A. For example, translating the inner extractor body 118 upstream restricts an area of the second outlet flow path 121, resulting in less flow in the second outlet stream 121A (e.g., less of the compressor outlet stream 108A flowing to the recirculation path 112) and more flow in the first outlet stream 120A. Translating the inner extractor body 118 downstream enlarges the area of the second outlet flow path 121, resulting in more flow in the second outlet stream 121A (e.g., more of the compressor outlet stream 108A flowing to the recirculation path 112) and less flow in the first outlet stream 120A.

It is to be understood that the configuration of the variable flow extractor 110 is one example of how the variable flow extractor 110 can be configured to split the compressor outlet stream 108A and that the variable flow extractor 110 can have any suitable configuration to vary the amount of flow passing through each of the recirculation path 112 and the system outlet path 114. For example, in some embodiments, the variable flow extractor 110 may include a central manifold that opens and closes to control the split ratio, similar to the variable area orifice 130 described with reference to the variable flow injector 122 herein.

The variable flow injector 122 is disposed upstream of the compressor 102. The variable flow extractor 110 is coupled to and in fluid communication with the system feed path 128. The variable injector 122 receives the system feed stream 128A from the system feed path 128. The variable injector 122 is also coupled to and in fluid communication with the recirculation path 112. The variable flow injector 122 receives at least a portion of the recirculation stream 112A from the recirculation path 112. The variable flow injector 122 is in fluid communication with the compressor inlet 102A and outputs at least a portion of the compressor inlet stream 106A. The variable flow injector 122 is configured to mix flow from a second inlet stream 125A with flow from a first inlet stream 123A radially inward of the second inlet stream 125A. For example, the variable flow injector 122 may be configured to mix the recirculation stream 112A with the system feed stream 128A to output an injector outlet stream 103. In FIG. 1, the inner first inlet stream 123A is connected to the system feed stream 128A while the second inlet stream 125A is connected to the recirculation stream 112A. In other embodiments, the outer second inlet stream 125A may instead be connected to the system feed stream 128A and the inner first inlet stream 123A may be connected to the recirculation stream 112A. Additionally, in some embodiments, the inner injector body 126 may include an opening to allow a part of the second inlet stream 125A to premix with the first inlet stream 123A inside the first inlet flow path 123 before the flow reaches the variable area orifice 130. The variable flow injector 122 may have a variable nozzle geometry that allows for adjusting a mix ratio of the second inlet stream 125A into the first inlet stream 123A.

In some configurations, the variable flow injector 122 comprises an outer injector body 124 with an inner injector body 126 disposed therein. The outer injector body 124 is hollow and, in some examples, includes a tapered portion. In some examples, the inner injector body 126 also includes a tapered portion. At least a portion of the inner injector body 126 is hollow to define a first inlet flow path 123 that extends through the inner injector body 126 from the system feed path 128 to the compressor inlet path 106. The first inlet stream 123A flows through the first inlet flow path 123. A space between the outer injector body 124 and the inner injector body 126 defines a second inlet flow path 125 that is coupled to and in fluid communication with the recirculation path 112. The second inlet stream 125A flows through the second inlet flow path 125.

In some examples, the inner injector body 126 has a variable area orifice 130. Varying the area of the variable area orifice 130 adjusts the mix ratio of the second inlet stream 125A into the first inlet stream 123A. For example, decreasing the area of the variable area orifice 130 restricts the outlet of the first inlet flow path 123 and increases an area of the second inlet flow path 125, resulting in more flow from the second inlet stream 125A flowing into the compressor inlet stream 106A (e.g., more flow from the recirculation path 112 to the of the compressor inlet stream 106A) and less flow from the first inlet stream 123A flowing into the compressor inlet stream 106A. This increases the mix ratio. Increasing the area of the variable area orifice 130 enlarges the outlet of the first inlet flow path 123 and decreases an area of the second inlet flow path 125, resulting in less flow from the second inlet stream 125A flowing into the compressor inlet stream 106A (e.g., less flow from the recirculation path 112 to the of the compressor inlet stream 106A) and more flow from the first inlet stream 123A flowing into the compressor inlet stream 106A. This decreases the mix ratio.

It is to be understood that the configuration of the variable flow injector 122 is one example of a variable geometry and of how the variable flow injector 122 can be configured to mix the system feed stream 128A and the recirculation stream 112A and that the variable flow injector 122 can have any suitable configuration to vary the amount of flow from the recirculation stream 112A mixed into the compressor inlet stream 106A. For example, in some embodiments, the variable flow injector 122 may include a translatable inner body that slides to control the mix ratio, similar to the inner extractor body 118 described with reference to the variable flow extractor 110 herein.

In some embodiments, the compressor system 100 further includes the variable area choke 132. The variable area choke 132 is disposed in the compressor outlet path 108. The variable area choke 132 is positioned downstream of the compressor 102 and upstream of the variable flow extractor 110. The variable area choke 132 is coupled to and in fluid communication with the variable flow extractor 110. The variable area choke 132 is also coupled to and in fluid communication with the compressor outlet 102B. In some configurations, the variable area choke 132 and the variable flow extractor 110 are a single, mechanically integrated device.

In some configurations, the variable area choke 132 includes an orifice 136 that is adjustable to modify a flow area of the variable area choke 132. Adjusting or modifying the flow area of the variable area choke 132 may adjust a flow coefficient for the compressor 102. At low flow coefficients, the compressor 102 may be close to stalling. At high flow coefficients, the compressor 102 may reach a limit, for example, and may be limited in the amount of flow that can pass through, resulting in a drop in efficiency. Adjusting the orifice to control the flow area of the variable area choke 132 may set the flow coefficient of the compressor 102 in a desired range. In some embodiments, the variable area choke 132 and the variable inlet guide vane 138 are a single, mechanically integrated device. In some embodiments, the variable inlet guide vane 138 may functionally serve as a variable area choke 132. In some embodiments, the variable area choke 132 may be implemented in the shape of a variable outlet guide vane.

In some embodiments, the compressor system 100 further includes the variable inlet guide vane 138. The variable inlet guide vane 138 is disposed on the compressor inlet path 106. The variable inlet guide vane 138 is positioned upstream of the compressor 102 and downstream of the variable flow injector 122. The variable inlet guide vane 138 is coupled to and in fluid communication with the variable flow injector 122. The variable inlet guide vane 138 is coupled to and in fluid communication with the compressor inlet 102A. The variable inlet guide vane 138 may ensure that incoming fluid enters the compressor inlet 102A at a desired flow angle. The variable inlet guide vane 138 includes at least one guide vane 140. The at least one guide vane 140 that is pitch-variable and has a pitch or angle 142 is adjustable based on variation in flow rates through the compressor 102. Adjusting the pitch or angle 142 may adjust the swirl of the compressor inlet stream 106A in a manner that improves the efficiency of the compressor 102.

In some embodiments, the recirculation path 112 includes a flow control valve 113. The flow control valve 113 is configured to control a flow rate of the recirculation stream 112A.

Figure 2:
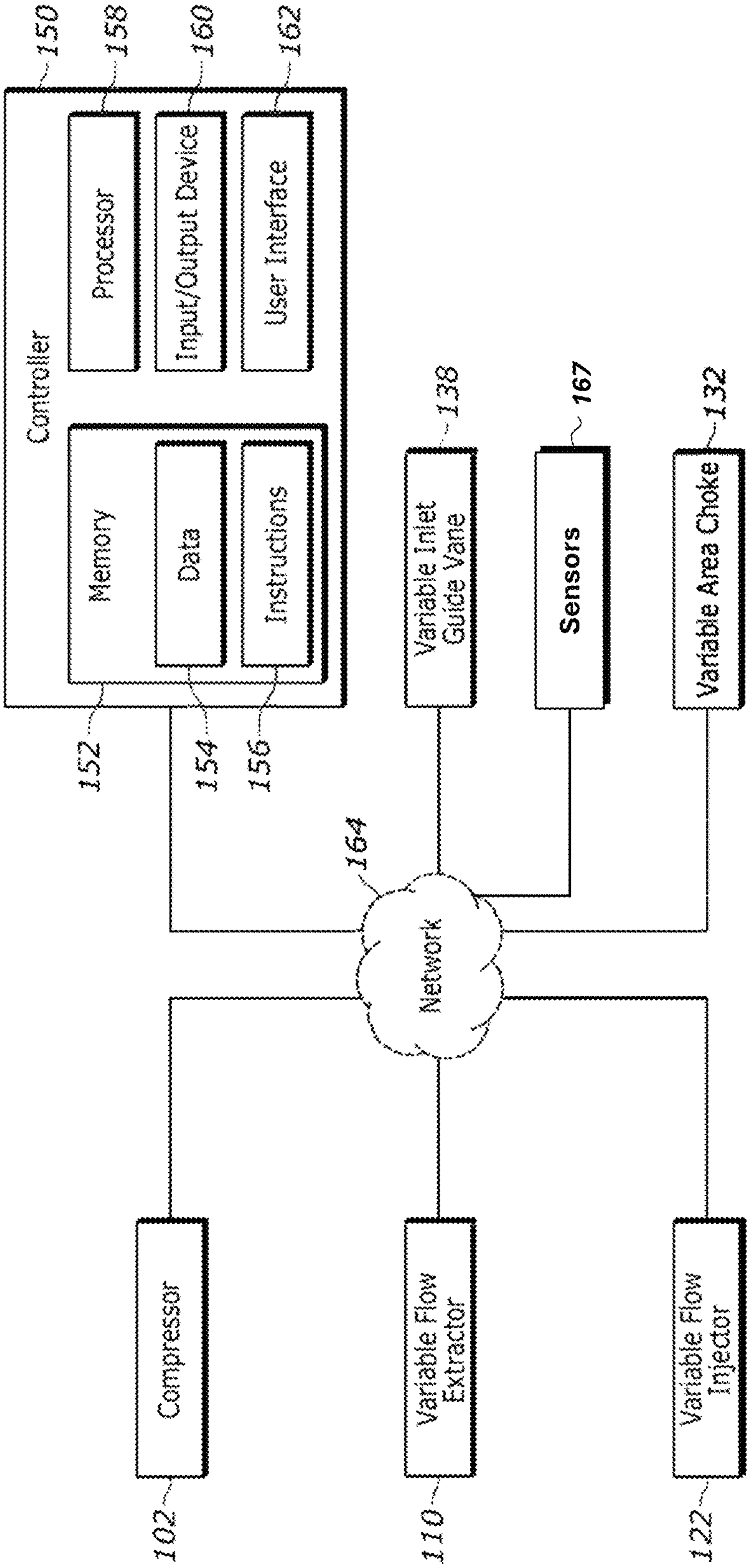
FIG. 2 is a schematic diagram of the compressor system of FIG. 1 in communication with a control unit, in accordance with various embodiments of these teachings.

FIG. 2 shows various components of the compressor system 100 in operative communication with a controller 150, in accordance with some embodiments. For example, the controller 150 may be in operative communication with one or more of the compressor 102, the variable flow extractor 110, the variable flow injector 122, the variable inlet guide vane 138, or the variable area choke 132. The controller 150 may be configured to actuate one or more of the components of the compressor system 100. The controller 150 can be configured to perform various operations of the compressor system.

The controller 150 typically comprises one or more processors 158 and/or microprocessors. The memory 152 stores the operational code or set of instructions 156 that is executed by the controller 150 and/or the one or more processors 158 to implement the functionality of the compressor system 100 or portions thereof. In some embodiments, the memory 152 may also store some or all of the data 154 associated with operation of the compressor system 100.

The controller 150 may be implemented as one or more processors 158. Similarly, the memory 152 may be implemented as one or more memory devices, such as one or more processor readable and/or computer-readable media, and can include volatile and/or nonvolatile media such as RAM, ROM, EEPROM, flash memory and/or other memory technology. Further, the memory 152 is shown as internal to the controller 150; however, the memory 152 can be internal, external or a combination of internal and external memory. Additionally, the controller 150 typically includes a power supply (not shown), which may be rechargeable, and/or may receive power from an external source.

The user interface 162 may be used to control one or more components of the compressor system 100. The user interface 162 may be used for user input and/or output display. For example, the user interface 162 may include any known input/output (I/O) devices 160, such as one or more buttons, knobs, selectors, switches, keys, touch input surfaces, audio input, and/or displays, etc. Additionally, the user interface 162 may include one or more output display devices, such as lights, visual indicators, display screens, etc., to convey information to a user, such as but not limited to communication information, status information, order information, delivery information, notifications, errors, conditions, and/or other such information. Similarly, the user interface 162 in some embodiments may include audio systems that can receive audio commands or requests verbally issued by a user, and/or output audio content, alerts, and the like.

The controller 150 further communicates with one or more sensors 167 in the engine. The sensors 167 may be located at one or more flow paths or engine components to measure engine data such as pressure and/or flow rate in flow paths or speed (e.g., rpm) of rotating components such as the compressor 102. For example, pressure or flow sensors may be located at recirculation path 112, system feed path 128, injector outlet stream 103, compressor inlet path 106, compressor outlet path 108, system outlet path 114, and/or between variable area choke 132 and variable flow extractor 110. In some embodiments, pressure or flow sensors may be located within the variable flow injector 122, compressor 102, variable area choke 132, and/or variable flow extractor 110. The number and locations of sensors in an engine may vary. In some embodiments, flow or pressure data of one or more flow paths may be directly measured with a sensor or may be estimated from sensors and/or operating parameters at other locations of the engine.

One or more components of the compressor system 100, in particular, the compressor 102, the variable flow extractor 110, the variable flow injector 122, the variable area choke 132, or the variable inlet guide vane 138, and the controller 150 communicate information to or from one another over the network 164. The network 164 can be any suitable communication network such as, for example, LAN, WAN, Internet, cellular, Wi-Fi, and other such communication networks or combinations of two or more of such networks.

In operation, the controller 150 is configured to actuate one or more of the compressor 102, the variable flow extractor 110, the variable flow injector 122, the variable area choke 132, or the variable inlet guide vane 138. For example, the controller 150 may be configured to actuate one or more of the variable flow extractor 110, the variable flow injector 122, the variable area choke 132, or the variable inlet guide vane 138 in order to maintain a pressure of the system outlet stream 114A at a target pressure. The controller 150 may be further configured to actuate one or more of the variable flow extractor 110, the variable flow injector 122, the variable area choke 132, or the variable inlet guide vane 138 in order to maintain a flow rate of the system outlet stream 114A at a target flow rate. In some embodiments, the controller 150 may be configured to control the rotational speed of the compressor 102 to maintain a flow rate of the system outlet stream 114A at a target flow rate. By operating these variable components to maintain a target flow rate and/or a target pressure of the system outlet stream 114A, the compressor 102 is able to accommodate a wider range of flow turndowns without sacrificing output flow and/or pressure than the traditional approaches, such as changing the rotational speed of compressor 102 alone.

In some embodiments, the controller 150 may control the compressor 102, the recirculation path 112, the variable flow injector 122, the system feed path 128, and/or the variable area choke 132 based on a feedback loop based on data captured and/or estimated from one or more sensors 167 in the engine. For example, the controller 150 may gradually change the operating parameters of an engine component until a measured parameter indicative of pressure or flow rate at a specific location is reached.

Figure 3:
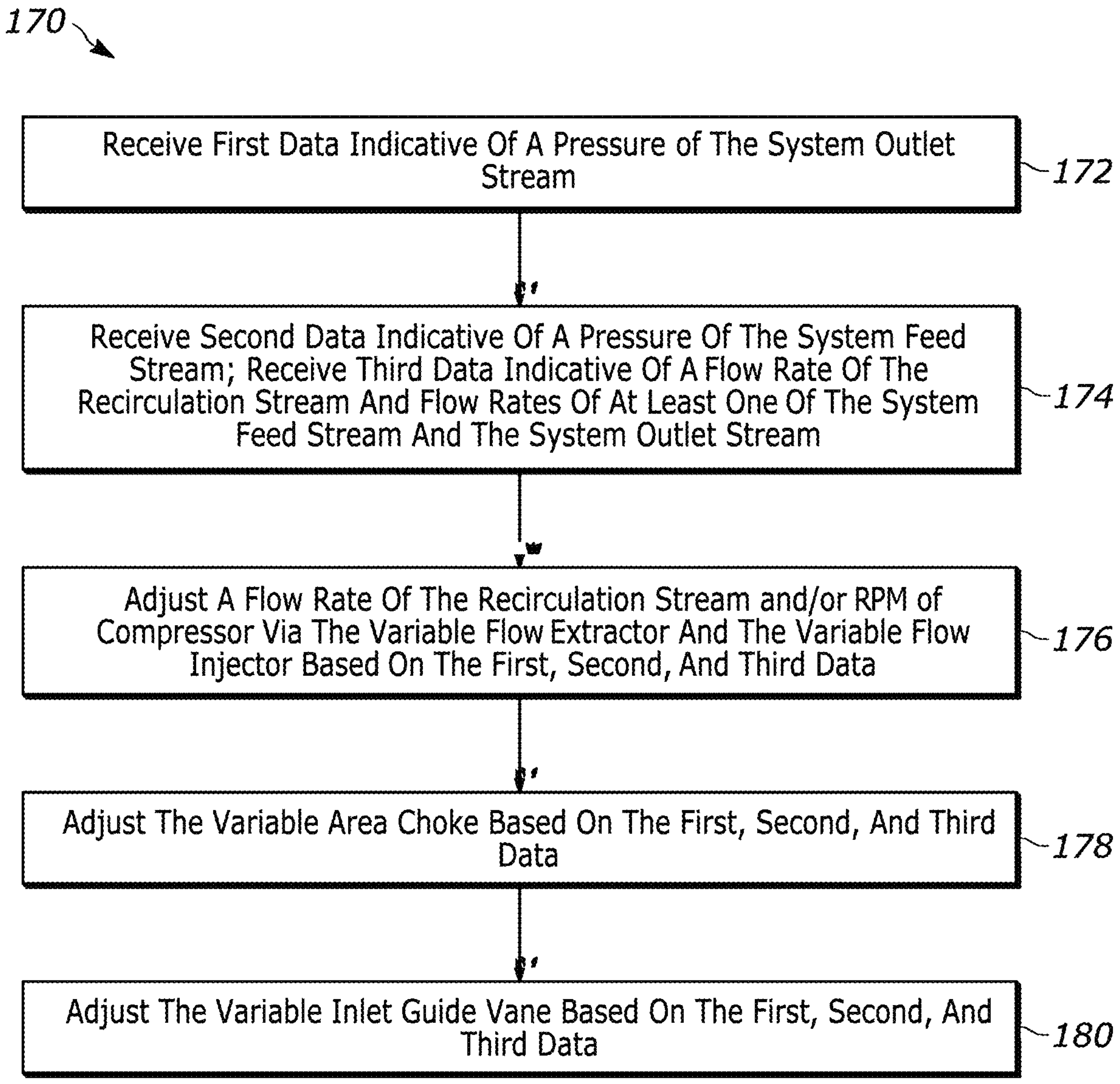
FIG. 3 is a flow diagram of a method of operating a compressor system, in accordance with various embodiments.

FIG. 3 shows a method 170 of operating the compressor system 100, in accordance with some embodiments. In some approaches, the controller 150 is configured to carry out the method 170 or portions thereof.

At block 172, the controller 150 receives first data indicative of a pressure of the system outlet stream 114A. As used herein, data indicative of pressure or flow rate may be directly measured by a flow rate/pressure sensor such as a sensor 167 or derived from other measured data that is sufficiently correlated to flow rate or pressure at the streams.

At block 174, the controller 150 receives second data indicative of a pressure of the system feed stream 128A. At block 174, the controller 150 further receives a third data indicative of the flow rate of recirculation stream 112A and flow rates of at least one of the system feed stream 128A and the system outlet stream 114A. In some embodiments, the flow rates of the system feed stream 128A and/or the system outlet stream 114A is a direct flow rate measurement data measured using a flow rate sensor such as a venturimeter. In other embodiments, flow rate is derived by measuring quantities indicative of the flow rate, such as total and static pressure at a specific location or pressure-ratio and work input across the compressor. In one example, flow rates of the system feed stream 128A and/or the system outlet stream

114A is estimated from measured pressure at injector outlet stream 103 and at guide vane 140 and the rpm of the compressor 102.

At block 176, the controller 150 adjusts a flow rate of the recirculation stream 112A via the variable flow extractor 110 and/or the variable flow injector 122 based on the first, second, and third data. In some examples, the controller adjusts a flow rate of the recirculation stream 112A to maintain the pressure of the system outlet stream 114A within a target range. In some examples, the controller adjusts a flow rate of the recirculation stream 112A to maintain the flow rate of the system outlet stream 114A within a target range. In some embodiments, the controller 150 may alternatively or additionally adjust the compressor speed, that is rotations per minute (RPM), based on the first, second, and third data to maintain the flow rate of the system outlet stream 114A within a target range. In some embodiments, the RPM of the compressor may be adjusted in a coordination with the adjustment of the flow rate of the recirculation stream.

In some approaches, the controller 150 adjusts the split ratio of the variable flow extractor 110 to adjust the flow rate of the recirculation stream 112A. For example, the controller 150 may actuate the inner extractor body 118 of the variable flow extractor 110 to move the inner extractor body 118 upstream or downstream to adjust the split ratio.

In some approaches, the controller 150 adjusts the mix ratio of the variable flow injector 122 to adjust the flow rate of the recirculation stream 112A. For example, the controller 150 may actuate the variable area orifice 130 of the variable flow injector 122 to increase or decrease the flow areas of the variable flow injector 122 to adjust the mix ratio. In some embodiments, adjustments in block 176 may be performed based on a feedback loop using measured data from the sensors 167.

At block 178, the controller 150 adjusts the variable area choke 132 based on the first, second, and third data. In some examples, the controller adjusts the variable area choke 132 to maintain the pressure of the system outlet stream 114A within a target range. In some examples, the controller adjusts the variable area choke 132 to maintain the flow rate of the system outlet stream 114A within a target range.

In some approaches, the controller 150 adjusts the orifice 136 of the variable area choke 132 based on the first, second, and third data. In some approaches, the controller 150 adjusts the orifice 136 of the variable area choke 132 to achieve a target flow coefficient for the compressor based on the first, second, and third data. In some embodiments, adjustments in block 178 may be performed based on a feedback loop using measured data from the sensors 167.

At block 180, the controller 150 adjusts the variable inlet guide vane 138 based on the first, second, and third data. In some examples, the controller adjusts the variable inlet guide vane 138 to maintain the pressure of the system outlet stream 114A within a target range. In some examples, the controller adjusts the variable inlet guide vane 138 to maintain the flow rate of the system outlet stream 114A within a target range. In some embodiments, adjustments in block 180 may be performed based on a feedback loop using measured data from the sensors 167.

In some approaches, the controller 150 adjusts the pitch or angle 142 of at least one guide vane 140 of the variable inlet guide vane 138 based on the first, second, and third data as measured and/or estimated by sensors. The controller 150 may adjust the pitch or angle 142 of at least one guide vane 140 to maintain the pressure and/or flow rate of the system outlet stream 114A in target range(s) automatically based on sensor data.

In some embodiments, the controller 150 is further in operative communication with the flow control valve 113. The controller 150 may actuate the flow control valve 113 based on the first, second, and third data to maintain the pressure and/or flow rate of the system outlet stream 114A in target range(s). The controller 150 may actuate the flow control valve 113 to adjust the flow rate of the recirculation stream 112A.

In some embodiments, the adjustments of various engine components described with reference to FIG. 4 may be performed with a feedback loop using data measured by the sensors 167.

Figure 4:
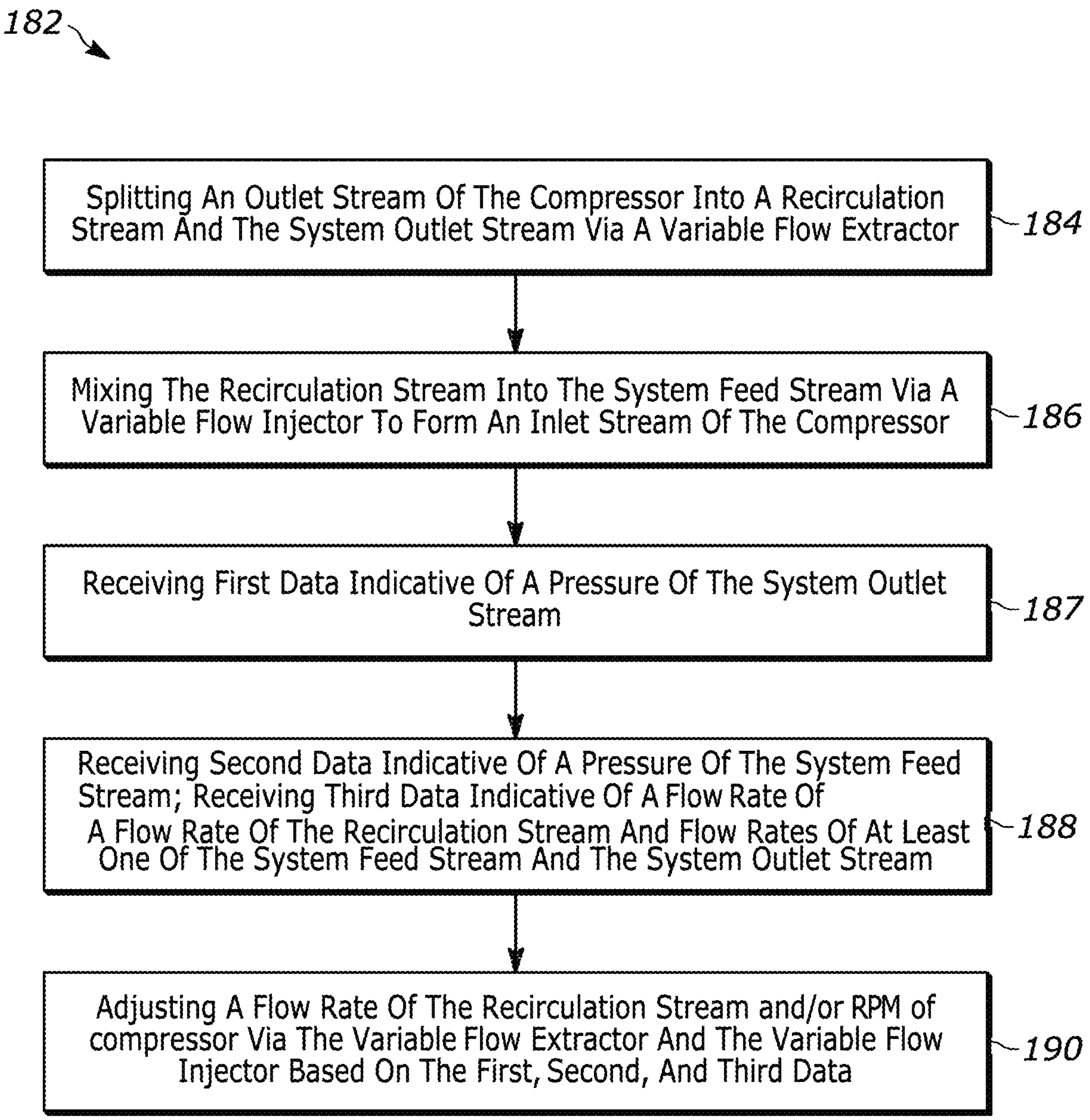
FIG. 4 is a flow diagram of a method of operating a compressor system, in accordance with various embodiments.

FIG. 4 shows a method 182 of operating a compressor system that comprises a compressor, in accordance with some embodiments. The compressor receives a system feed stream and outputs a system outlet stream. In some approaches, the compressor system is the compressor system 100 or portions thereof and the controller 150 is configured to carry out the method 182 or portions thereof.

At block 184, the method 182 comprises splitting an outlet stream of the compressor into a recirculation stream and the system outlet stream via a variable flow extractor. In some examples, the variable flow extractor is the variable flow extractor 110 shown and described with reference to FIG. 1.

At block 186, the method 182 comprises mixing the recirculation stream into the system feed stream via a variable flow injector to form an inlet stream of the compressor. In some examples, the variable flow injector is the variable flow injector 122 shown and described with reference to FIG. 1.

At block 187, the method 182 comprises receiving first data that includes a pressure of the system outlet stream.

At block 188, the method 182 comprises receiving second data that includes a pressure of the system feed stream. The controller 150 further receives a third data that includes the flow rate of recirculation stream 112A and the flow rate of at least one of the system feed stream 128A and the system outlet stream 114A.

At block 190, the method 182 comprises adjusting a flow rate of the recirculation stream via the variable flow extractor and the variable flow injector based on the first, second, and third data. In some approaches, the flow rate of the recirculation stream is adjusted to maintain the pressure of the system outlet stream at a target pressure or within a target pressure range. In some approaches, the flow rate of the recirculation stream is adjusted to maintain the flow rate of the system outlet stream at a flow rate or within a target flow range. In some embodiments, the controller 150 may alternatively or additionally adjust the compressor RPM based on the first, second, and third data. In some embodiments, the RPM of the compressor may be adjusted in coordination with the adjustment of the flow rate of the recirculation stream. In some embodiments, adjustments in block 190 may be performed based on a feedback loop using measured data from the sensors 167.

In some embodiments, the method 182 further includes adjusting a flow of the outlet stream of the compressor via a variable area choke that is disposed upstream of the variable flow extractor. In some examples, the variable area choke is the variable area choke 132 shown and described with reference to FIG. 1. The variable area choke may include an orifice that is adjustable to modify a flow area of the variable area choke. When the variable area choke is configured in this manner, the size of the orifice can be adjusted based on the first, second, and third data to maintain a target flow coefficient for the compressor.

In some embodiments, the method 182 further includes adjusting a flow of the inlet stream of the compressor via a variable inlet guide vane. The variable inlet guide vane is disposed upstream of the compressor and downstream of the variable flow injector. In some examples, the variable inlet guide vane is the variable inlet guide vane 138 shown and described with reference to FIG. 1. In some approaches, the variable inlet guide vane includes at least one vane having an angle that is adjustable. When the variable inlet guide vane is configured in this manner, the angle of the at least one vane can be adjusted based on the first, second, and third data.

In some embodiments, the method 182 may alternatively or additionally adjust the RPM of the compressor based on the first, second and third data. That is, the system may adjust the flow recirculation rate, the RPM of the compressor, or both based on the first, second, and third data.

In yet other embodiments, the method 182 further includes adjusting a flow rate of the recirculation stream via a flow control valve disposed in the recirculation stream. In some examples, the flow control valve is the flow control valve 113 shown and described with reference to FIG. 1. The flow control valve can be controlled based, at least in part, on the first, second, and third data, for example, to maintain the pressure and/or flow rate of the system outlet stream within a target range(s).

In some embodiments, the adjustments of various engine components described with reference to FIG. 4 may be performed with a feedback loop using data measured by the sensors 167. FIGS. 5, 6, 7A, and 7B are graphs illustrating example relations between parameters of a dynamic compressor according to some embodiments of the compressor system 100 described herein. The graphs are provided for illustrative purposes only to show relationships between compressor parameters in some embodiments. The values and scales in these figures may not correspond to actual values and scales. In some of the figures, the values and scales are not included in the graph because they can vary based on the specifics of implementations, configurations, and operating conditions. In these figures, turndown ratio refers to the range over which the compressor can operate efficiently. Specifically, it is the ratio of the maximum to the minimum flow rate at which the compressor can maintain stable operation. Turn down ratio of 1 generally corresponds to the design flow rate of the compressor.

Figure 5:
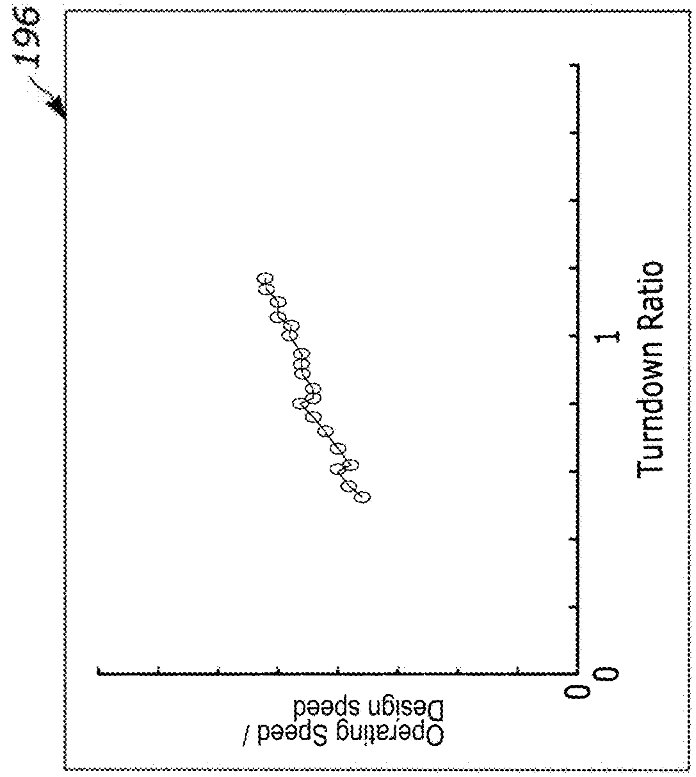
FIG. 5 is a graph of the operating speed as a function of compressor turndown ratio in the compressor system of FIG. 1.

In graph 196 shown in FIG. 5, the x-axis shows the turndown ratio of the flow through the compressor 102 and the y-axis shows the operating speed of the compressor 102 as a ratio to the design speed. When the turndown ratio is around 1, the compressor 102 is operating at around design speed in the Y-axis.

Figure 6:
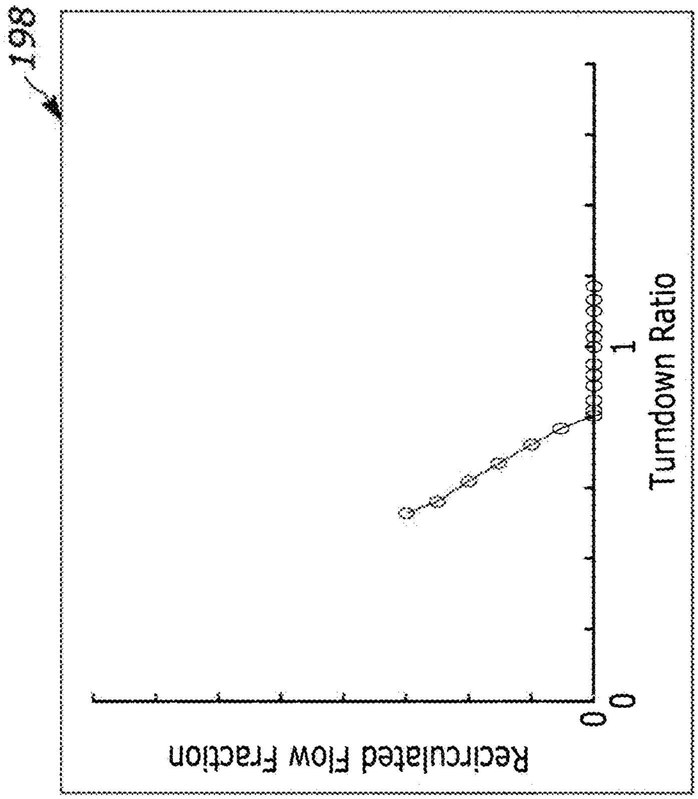
FIG. 6 is a graph of the recirculated flow fraction as a function of compressor turndown ratio in the compressor system of FIG. 1.

In graph 198 shown in FIG. 6, the x-axis shows the turndown ratio of the flow through the compressor 102 and the y-axis shows the fraction of flow recirculated from the exit of the compressor 102 to the compressor inlet 106. When the turndown ratio is around 1, no flow is recirculated. However, when the turndown ratio falls below a predetermined threshold (t), recirculation is required. As the turndown ratio decreases further from the threshold value, an increasing amount of flow is recirculated through the compressor 102 via the recirculation stream 112A. The threshold values may be variously set depending on the configuration and/or operating condition of the engine.

As shown in graphs 196 and 198, when moving to lower flows, as represented by lower turndown ratios, flow recirculation in the recirculation stream 112A increases and the speed of the compressor 102 reduces to meet the target pressure. At high flows, as represented by higher turndown ratios, recirculation in the recirculation stream 112A is not needed.

Figure 7A:
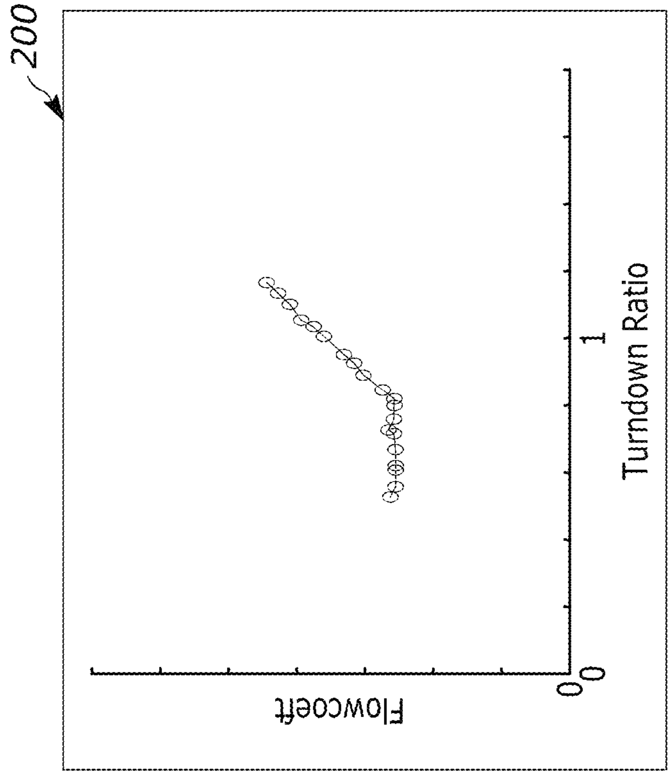
FIG. 7A is a graph of the flow coefficient as a function of compressor turndown ratio in the compressor system of FIG. 1.

In the graph 200 shown in FIG. 7A, the x-axis shows the turndown ratio of the flow through the compressor 102 and the y-axis shows the flow coefficient of the compressor 102. FlowCoeft is defined as % FlowCoeft=(Mass Flow through Compressor at 106)/(Density at system feed path 128*(pi*Rtip^2)*(2*pi*N_rpm/60*Rtip)). Where Rtip is the tip tadius of the most upstream compressor rotor, N_rpm is the revolutions per minute of the compressor shaft.

Figure 7B:
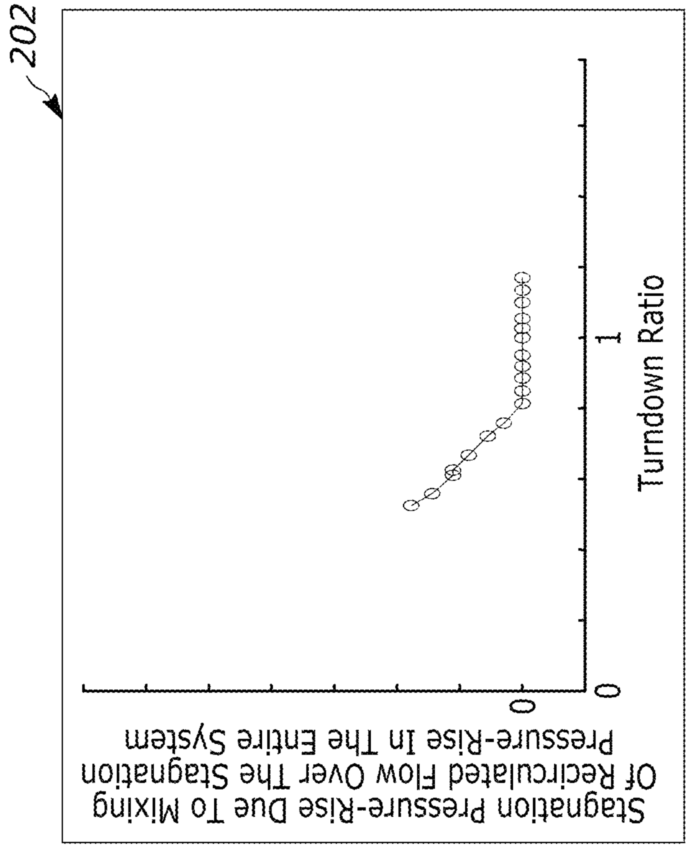
FIG. 7B is a graph of stagnation pressure-rise due to mixing of recirculated flow over the stagnation pressure-rise in the entire system as a function of compressor turndown ratio in the compressor system of FIG. 1.

In the graph 202 shown in FIG. 7B, the x-axis shows the turndown ratio of the flow through the compressor 102 and the y-axis shows the compressor-to-system pressure ratio, which is the total stagnation pressure-rise from system feed path 128 to compressor inlet path 106 rise due to mixing of recirculated flow over the stagnation total-pressure rise from system feed path 128 to system outlet path 114. Generally, stagnation pressure refers to the static pressure when a moving parcel of fluid is isentropically brought to rest.

As shown in graphs 200 and 202, the flow coefficient of the compressor 102 is maintained above a value that represents the minimum flow coefficient before compressor stall for a wide range of turndown ratio (e.g., about 0.6 to about 1.2). Further, target pressure can be reached at low speeds because mixing the recirculated fluid contributes to the pressure rise.

It is understood that terms "upstream" and "downstream" refer to the relative direction with respect to fluid flow in a fluid pathway. For example, "upstream" refers to the direction from which the fluid flows, and "downstream" refers to the direction to which the fluid flows.

The terms and expressions used herein have the ordinary technical meaning as is accorded to such terms and expressions by persons skilled in the technical field as set forth above, except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Further aspects of the disclosure are provided by the subject matter of the following clauses:

A compressor system includes a compressor having a compressor inlet that receives a compressor inlet stream and a compressor outlet that outputs a compressor outlet stream; a variable flow extractor disposed downstream of the compressor to split the compressor outlet stream into a recirculation stream and a system outlet stream; a variable flow injector disposed upstream of the compressor that receives a system feed stream and mixes the recirculation stream with the system feed stream to form the compressor inlet stream; and a controller operatively coupled to the variable flow extractor and the variable flow injector, the controller configured to: receive first data indicative of a pressure of the system outlet stream; receive second data indicative of a pressure of the system feed stream; receive third data indicative of a flow rate of the recirculation stream and flow rates of at least one of the system feed stream and the system outlet stream; and adjust a flow rate of the recirculation stream via the variable flow extractor and the variable flow injector based on the first data, the second data, and the third data to maintain the pressure of the system outlet stream within a target range.

The compressor system of any preceding clause, wherein the controller is further configured to adjust the flow rate of the recirculation stream and a rotational speed of the compressor in a coordination based on the first data, the second data, and the third data.

The compressor system of any preceding clause, wherein the variable flow extractor is configured to split a flow into a first outlet stream and a second outlet stream, a split ratio of the first outlet stream and the second outlet stream being adjustable.

The compressor system of any preceding clause, wherein the controller is configured to adjust the flow rate of the recirculation stream by adjusting the split ratio of the variable flow extractor.

The compressor system of any preceding clause, wherein the variable flow injector is configured to mix flow from a first inlet stream and a second inlet stream, a mix ratio of the second inlet stream to the first inlet stream being adjustable.

The compressor system of any preceding clause, wherein the controller is configured to adjust the flow rate of the recirculation stream by adjusting the mix ratio.

The compressor system of any preceding clause, further including: a variable area choke disposed between, and in fluid communication with, the compressor outlet and the variable flow extractor.

The compressor system of any preceding clause, wherein the variable area choke and the variable flow extractor are a single mechanically integrated device.

The compressor system of any preceding clause, wherein the variable area choke includes an orifice that is adjustable to modify a flow area, and wherein the controller is further configured to adjust the orifice based on the first data, the second data, and the third data to achieve a target flow coefficient for the compressor.

The compressor system of any preceding clause, further including: a variable inlet guide vane disposed between, and in fluid communication with, the compressor inlet and the variable flow injector.

The compressor system of any preceding clause, wherein the variable inlet guide vane and the variable flow injector are a single mechanically integrated device.

The compressor system of any preceding clause, wherein the variable inlet guide vane includes at least one vane having an angle that is adjustable, and wherein the controller is further configured to adjust the angle of the at least one vane.

The compressor system of any preceding clause, further including: a recirculation path that receives the recirculation stream from the variable flow extractor and feeds the recirculation stream to the variable flow injector; and a flow control valve disposed in the recirculation path to control the flow rate of the recirculation stream.

A method of operating a compressor system including a compressor, the compressor system receiving a system feed stream and outputting a system outlet stream, the method includes splitting an outlet stream of the compressor into a recirculation stream and the system outlet stream via a variable flow extractor; mixing the recirculation stream into the system feed stream via a variable flow injector to output an inlet stream of the compressor; receiving first data indicative of a pressure of the system outlet stream; receiving second data indicative of a pressure of the system feed stream; receiving third data indicative of a flow rate of the recirculation stream and flow rates of at least one of the system feed stream and the system outlet stream; and adjusting a flow rate of the recirculation stream via the variable flow extractor and the variable flow injector and a rotational speed of the compressor based on the first data, the second data, and the third data to maintain the pressure of the system outlet stream at a target pressure.

The method of any preceding clause, further including: adjusting a flow of the outlet stream of the compressor via a variable area choke upstream of the variable flow extractor.

The method of any preceding clause, wherein the variable area choke includes an orifice that is adjustable to modify a flow area, and wherein the method further includes adjusting a size of the orifice based on the second data to achieve a target flow coefficient for the compressor.

The method of any preceding clause, further including: adjusting a flow of the inlet stream of the compressor via a variable inlet guide vane downstream of the variable flow injector.

The method of any preceding clause, wherein the variable inlet guide vane includes at least one vane having an angle that is adjustable, and wherein method further includes adjusting the angle of the at least one vane.

The method of any preceding clause, further including: adjusting the flow rate of the recirculation stream via a flow control valve disposed in the recirculation stream.

A compressor comprises a compressor inlet that receives a compressor inlet stream and a compressor outlet that outputs a compressor outlet stream; a variable flow extractor disposed downstream of the compressor to split the compressor outlet stream into a recirculation stream and a system outlet stream; a variable flow injector disposed upstream of the compressor that receives a system feed stream and mix the recirculation stream with the system feed stream to form the compressor inlet stream; a variable area choke disposed between, and in fluid communication with, the compressor outlet and the variable flow extractor; a variable inlet guide vane disposed between, and in fluid communication with, the compressor inlet and the variable flow injector; and a controller operatively coupled to the variable flow extractor, the variable flow injector, the variable area choke, and the variable inlet guide vane, the controller configured to: receive first data indicative of a pressure of the system outlet stream; receive second data indicative of a pressure of the system feed stream; receiving third data indicative of a flow rate of the recirculation stream and flow rates of at least one of the system feed stream and the system outlet stream; and actuate the variable flow extractor, the variable flow injector, the variable area choke, and the variable inlet guide vane based on the first data, the second data, and the third data to maintain the pressure of the system outlet stream within a target range.

What is claimed is:

1. A compressor system comprising:
a compressor having a compressor inlet that receives a compressor inlet stream and a compressor outlet that outputs a compressor outlet stream;
a variable flow extractor disposed downstream of the compressor to split the compressor outlet stream into a recirculation stream and a system outlet stream;
a variable flow injector disposed upstream of the compressor that receives a system feed stream and mixes the recirculation stream with the system feed stream to form the compressor inlet stream; and
a controller operatively coupled to the variable flow extractor and the variable flow injector, the controller configured to:
receive first data indicative of a pressure of the system outlet stream;
receive second data indicative of a pressure of the system feed stream;
receive third data indicative of a flow rate of the recirculation stream and flow rates of at least one of the system feed stream and the system outlet stream; and
adjust a flow rate of the recirculation stream via the variable flow extractor and the variable flow injector based on the first data, the second data, and the third data to maintain the pressure of the system outlet stream within a target range.

2. The compressor system of claim 1, wherein the controller is further configured to adjust the flow rate of the recirculation stream and a rotational speed of the compressor in a coordination based on the first data, the second data, and the third data.

3. The compressor system of claim 1, wherein a split ratio is defined by a ratio of the system outlet stream to the recirculation stream and wherein the split ratio is adjustable.

4. The compressor system of claim 3, wherein the controller is configured to adjust the flow rate of the recirculation stream by adjusting the split ratio of the variable flow extractor.

5. The compressor system of claim 1, wherein the variable flow injector is configured to produce an adjustable mix ratio of the recirculation stream to the system feed stream.

6. The compressor system of claim 5, wherein the controller is configured to adjust the flow rate of the recirculation stream by adjusting the adjustable mix ratio.

7. The compressor system of claim 1, further comprising:
a variable area choke disposed between, and in fluid communication with, the compressor outlet and the variable flow extractor.

8. The compressor system of claim 7, wherein the variable area choke and the variable flow extractor are a single mechanically integrated device.

9. The compressor system of claim 7, wherein the variable area choke includes an orifice that is adjustable to modify a flow area, and wherein the controller is further configured to adjust the orifice based on the first data, the second data, and the third data to achieve a target flow coefficient for the compressor.

10. The compressor system of claim 1, further comprising:
a variable inlet guide vane disposed between, and in fluid communication with, the compressor inlet and the variable flow injector.

11. The compressor system of claim 10, wherein the variable inlet guide vane and the variable flow injector are a single mechanically integrated device.

12. The compressor system of claim 10, wherein the variable inlet guide vane comprises at least one vane having an angle that is adjustable, and wherein the controller is further configured to adjust the angle of the at least one vane.

13. The compressor system of claim 1, further comprising:
a recirculation path that receives the recirculation stream from the variable flow extractor and feeds the recirculation stream to the variable flow injector; and
a flow control valve disposed in the recirculation path to control the flow rate of the recirculation stream.

14. A method of operating a compressor system comprising a compressor, the compressor system receiving a system feed stream and outputting a system outlet stream, the method comprising:
splitting an outlet stream of the compressor into a recirculation stream and the system outlet stream via a variable flow extractor;
mixing the recirculation stream into the system feed stream via a variable flow injector to output an inlet stream of the compressor;
receiving first data indicative of a pressure of the system outlet stream;
receiving second data indicative of a pressure of the system feed stream;
receiving third data indicative of a flow rate of the recirculation stream and flow rates of at least one of the system feed stream and the system outlet stream; and
adjusting a flow rate of the recirculation stream via the variable flow extractor, the variable flow injector, and a rotational speed of the compressor based on the first data, the second data, and the third data to maintain the pressure of the system outlet stream at a target pressure.

15. The method of claim 14, further comprising:
adjusting a flow of the outlet stream of the compressor via a variable area choke upstream of the variable flow extractor.

16. The method of claim 15, wherein the variable area choke includes an orifice that is adjustable to modify a flow area, and wherein the method further includes adjusting a size of the orifice based on the second data to achieve a target flow coefficient for the compressor.

17. The method of claim 14, further comprising:
adjusting a flow of the inlet stream of the compressor via a variable inlet guide vane downstream of the variable flow injector.

18. The method of claim 17, wherein the variable inlet guide vane comprises at least one vane having an angle that is adjustable, and wherein method further comprises adjusting the angle of the at least one vane.

19. The method of claim 14, further comprising:
adjusting the flow rate of the recirculation stream via a flow control valve disposed in the recirculation stream.

20. A compressor system comprising:
a compressor having a compressor inlet that receives a compressor inlet stream and a compressor outlet that outputs a compressor outlet stream;
a variable flow extractor disposed downstream of the compressor to split the compressor outlet stream into a recirculation stream and a system outlet stream;
a variable flow injector disposed upstream of the compressor that receives a system feed stream and mix the recirculation stream with the system feed stream to form the compressor inlet stream;
a variable area choke disposed between, and in fluid communication with, the compressor outlet and the variable flow extractor;

a variable inlet guide vane disposed between, and in fluid communication with, the compressor inlet and the variable flow injector; and a controller operatively coupled to the variable flow extractor, the variable flow injector, the variable area choke, and the variable inlet guide vane, the controller configured to:

receive first data indicative of a pressure of the system outlet stream;

receive second data indicative of a pressure of the system feed stream;

receive third data indicative of a flow rate of the recirculation stream and flow rates of at least one of the system feed stream and the system outlet stream; and actuate the variable flow extractor, the variable flow injector, the variable area choke, and the variable inlet guide vane based on the first data, the second data, and the third data to maintain the pressure of the system outlet stream within a target range.

* * * * *